United States Patent [19]

Plant

[11] Patent Number: 5,006,670
[45] Date of Patent: Apr. 9, 1991

[54] ELECTRIC POWER CABLE

[75] Inventor: Neil R. Plant, Athens, Canada

[73] Assignee: Phillips Cables Ltd., Ontario, Canada

[21] Appl. No.: 438,008

[22] Filed: Nov. 20, 1989

[30] Foreign Application Priority Data

Nov. 25, 1988 [GB] United Kingdom ............. 8827681.2

[51] Int. Cl.$^5$ .............................................. H01B 7/28
[52] U.S. Cl. ........................ 174/106 SC; 174/102 SC; 174/105 SC
[58] Field of Search ......... 174/105 R, 105 SC, 106 R, 174/106 SC, 102 SC, 107

[56] References Cited

U.S. PATENT DOCUMENTS

| | | | |
|---|---|---|---|
| 1,926,899 | 9/1933 | Gilbert | 174/105 R |
| 3,474,186 | 10/1969 | Hale | 174/103 |
| 3,484,532 | 12/1969 | Anderson | 174/36 |
| 4,117,250 | 9/1978 | Wilkenloh | 174/106 R |
| 4,187,391 | 2/1980 | Voser | 174/106 R |
| 4,250,351 | 2/1981 | Bridges | 174/106 R |
| 4,278,835 | 7/1981 | Jackson | 174/106 R X |
| 4,327,246 | 4/1982 | Kincaid | 174/36 |
| 4,406,914 | 9/1983 | Kincaid | 174/107 |
| 4,472,597 | 9/1984 | Uematsu | 174/106 R X |
| 4,477,693 | 10/1984 | Krabec et al. | 174/36 |
| 4,501,928 | 2/1985 | Ishitobi | 174/106 SC X |
| 4,626,619 | 12/1986 | Uematsu | 174/106 R X |
| 4,691,081 | 9/1987 | Gupta et al. | 174/105 R |
| 4,703,134 | 10/1987 | Uematsu | 174/106 R X |
| 4,769,514 | 9/1988 | Uematsu et al. | 174/102 SC X |

FOREIGN PATENT DOCUMENTS 1011223 11/1965 United Kingdom ......... 174/106 SC

Primary Examiner—Morris H. Nimmo
Attorney, Agent, or Firm—Oliff & Berridge

[57] ABSTRACT

In a single core or multi-core electric power cable, the dielectric screen of the or each cable core is surrounded by a moisture barrier consisting of a composite tape comprising a carrier layer of plastics material which is sandwiched between radially inner and outer metal foils bonded to the major surfaces of the carrier layer and electrically connected together. The composite tape surrounds the dielectric screen with its longitudinally extending edges overlapping and secured to one another throughout their lengths to form a moisture-tight seal. The moisture barrier so formed effects electrical interconnection between the underlying dielectric screen and a surrounding neutral, earth or ground conductor of the core. The moisture barrier is less expensive than moisture barriers hitherto proposed and used.

13 Claims, 2 Drawing Sheets

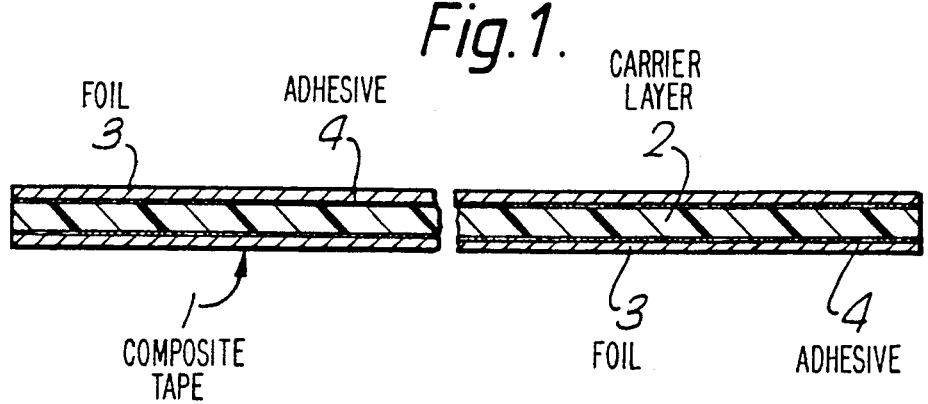
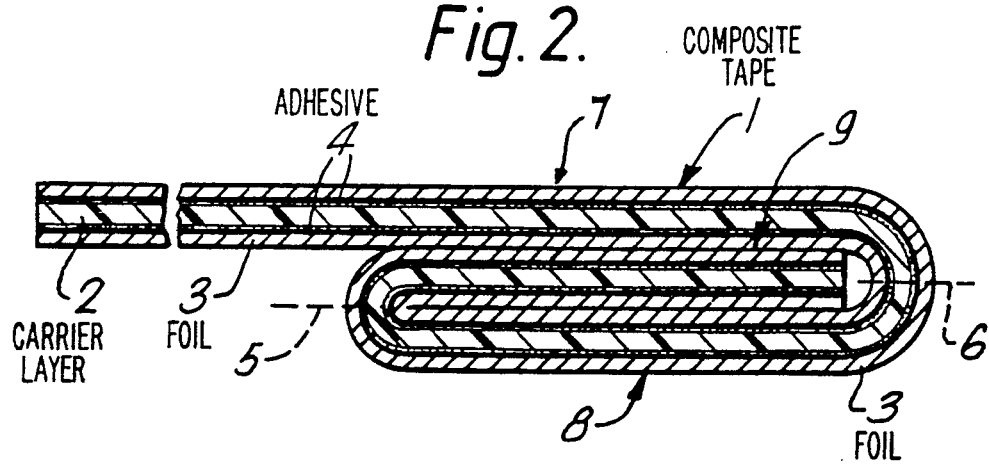

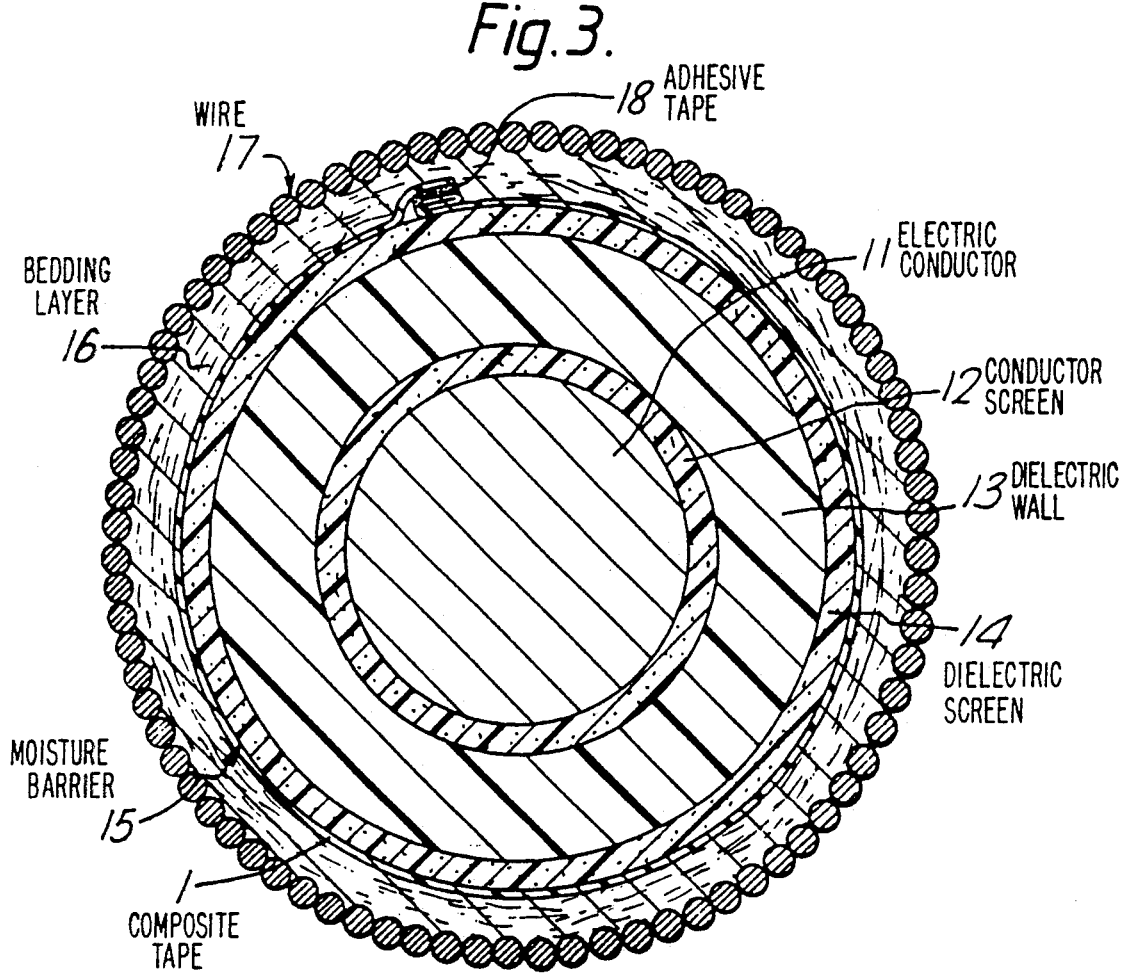
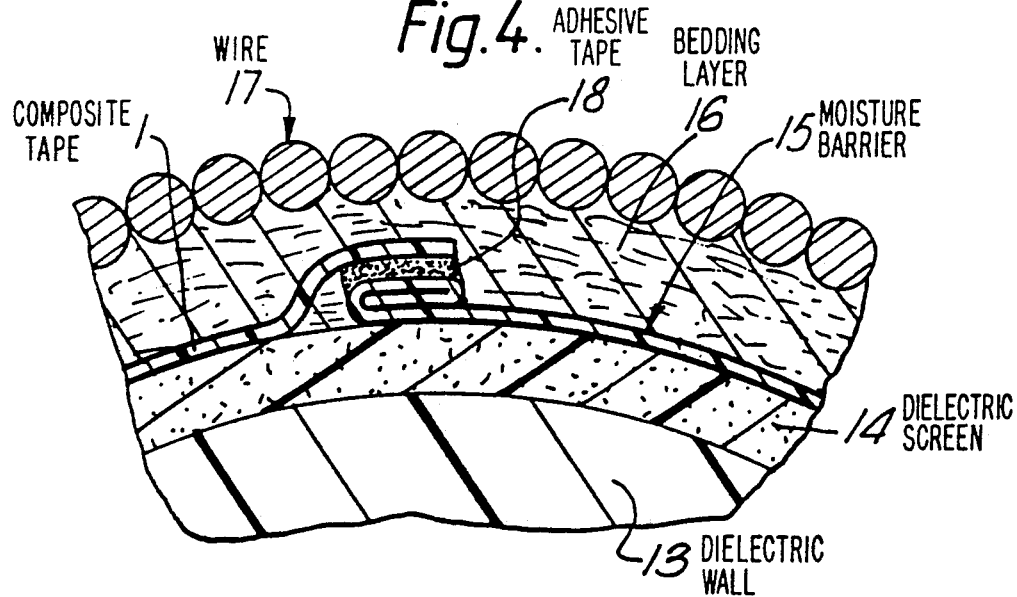

ELECTRIC POWER CABLE

This invention relates to electric power cables of the kind comprising at least one cable core consisting of an electric conductor, an electrically conductive or semi-conductive conductor screen surrounding the conductor, a dielectric wall of electrically insulating material surrounding the conductor screen, an electrically conductive or semi-conductive dielectric screen surrounding the dielectric wall, a moisture-barrier surrounding the dielectric screen and, surrounding the moisture-barrier, a layer of metal or metal alloy suitable for use as a neutral, earth or ground conductor. An electric power cable of this construction will, for convenience, hereinafter be referred to as "an electric power cable of the kind described".

It is an object of the present invention to provide, in an electric power cable of the kind described, an improved moisture-barrier which can be readily applied during assembly of the or each cable core and which is substantially less expensive than moisture-barriers hitherto proposed and used.

In an electric power cable of the kind described in accordance with the invention, the moisture-barrier of the or each cable core consists of a composite tape comprising a carrier layer of plastics material which is sandwiched between radially inner and outer substantially fluid-impermeable foils of metal or metal alloy mechanically bonded to the major surfaces of the carrier layer and electrically connected together, which composite tape surrounds the dielectric screen of the core with its longitudinally extending edges overlapping and secured to one another throughout their lengths to form a substantially moisture-tight seal between said overlapping edges, the moisture-barrier thereby effecting electrical interconnection between the underlying dielectric screen and the surrounding neutral, earth or ground conductor of the core.

By virtue of the fact that the improved moisture-barrier consists of a composite tape comprising a plastics carrier layer sandwiched between radially inner and outer foils of metal or metal alloy, the chances that a pin hole in one foil will immediately overlie or underlie a pin hole in the other foil are remote, with the result that the risk of moisture penetration is substantially reduced as compared with the same risk where a moisture barrier consists of a single foil of metal or metal alloy which may be prone to pin holes.

Electrical connection between the metal foils of the composite tape of the improved moisture barrier may be effected by using for the carrier layer a plastics material which is sufficiently semi-conductive to electrically interconnect the metal foils but, with a view to keeping the moisture-barrier as inexpensive as possible, preferably electrical connection between the metal foils is effected, before the composite tape is applied over the dielectric screen, by folding a longitudinally extending marginal portion of the composite tape in the same sense along two longitudinally extending transversely spaced lines so that the longitudinally extending part of said marginal portion of the composite tape nearer the longitudinally extending edge of the marginal portion is sandwiched between the other part of the marginal portion and the main portion of the composite tape; the two metal foils of the composite tape are thereby in a direct electrical contact.

The overlapping edges of the composite tape constituting the improved moisture barrier preferably are sealed together throughout their lengths by a double-sided adhesive tape or by a hot melt adhesive, the thickness of each of which may be approximately equal to three times the overall thickness of the composite tape.

The composite tape with said marginal portion of the tape folded as described may extend helically around the dielectric screen of the core but preferably the composite tape extends lengthwise along and is transversely folded around the dielectric screen.

The plastics material of the carrier layer of the composite tape of the improved moisture-barrier may be of polyethylene, polypropylene, polyester or any other plastics material capable of withstanding the physical and thermal conditions to which it will be subjected when the cable is manufactured and installed and when the cable is in service.

Each metal foil of the composite tape of the improved moisture-barrier is preferably of aluminium but it may be of copper, lead or any other metal or metal alloy of high electrical conductivity which can be used in the form of a foil.

For ease of application to the underlying screened insulated conductor of the core, preferably the composite tape has an overall thickness lying in the range 1.5 to 5 mils (0.038–0.127 mm). In a preferred embodiment, each foil of aluminium has a thickness of approximately 0.35 mil (0.009 mm) and the carrier layer of plastics material has a thickness of approximately 2 mils (0.051 mm).

Preferably, each metal foil of the composite tape is mechanically bonded to a major surface of the carrier layer by a substantially continuous layer of hot-melt adhesive.

Where the electric power cable of the present invention is a single core cable, preferably the neutral, earth or ground conductor of the cable surrounding the moisture-barrier is a layer of helically wound wires of metal or metal alloy and, in this case, preferably there is provided between the moisture-barrier and the layer of wires an electrically conductive bedding layer for the wires, e.g. a layer of helically applied semi-conductive fibrous tape or a water-swellable semi-conductive tape.

Where the electric power cable of the present invention is a multi-core cable, the neutral, earth or ground conductor of each cable core preferably comprises a layer of helically applied tape of metal or metal alloy.

The invention is further illustrated by a description, by way of example, of a preferred composite tape to be used to form the improved moisture barrier of a cable core and of a single core electric power cable incorporating the improved moisture barrier with reference to the accompanying drawings, in which:

FIG. 1 is a traverse cross-sectional view, drawn on a greatly enlarged scale, of the preferred composite tape;

FIG. 2 is a fragmental transverse cross-sectional view, drawn on a greatly enlarged scale, of the preferred method of effecting electrical connection between the metal foils of the composite tape shown in FIG. 1;

FIG. 3 is a transverse cross-sectional diagrammatic view of the single core electric power cable, and FIG. 4 is a fragmental transverse cross-sectional view, drawn on a greatly enlarged scale, of detail of the single core electric power cable shown in FIG. 3.

Referring to FIG. 1, the preferred composite tape 1 to be used to form the improved moisture barrier of a cable core comprises a carrier layer 2 of polyethylene having a thickness of approximately 2 mils (0.051 mm) which is sandwiched between fluid impermeable foils 3 of aluminium, each having a thickness of approximately 0.35 mils (0.009 mm), mechanically bonded to major surfaces of the carrier layer by a continuous layer 4 of hot melt adhesive.

Before composite tape 1 is to be used to form the improved moisture barrier of a cable core, as will be seen in referring to FIG. 2 a longitudinally extending marginal portion of the composite tape is folded in the same sense along two longitudinally extending transversely spaced lines 5 and 6 so that the part 9 of the composite tape is sandwiched between a part 8 of the composite tape and the main part 7 of the composite tape so that the two aluminium foils 3 of the composite tape are directly electrically connected. The double-folded composite tape 1 as shown in FIG. 2 is in a form suitable for applying longitudinally to and folding transversely around the dielectric screen of a cable core.

The single core electric power cable shown in FIGS. 3 and 4 comprises an electric conductor 11, an electrically semi-conductive conductor screen 12 surrounding the conductor, a dielectric wall 13 of electrically insulating material surrounding the conductor screen, an electrically semi-conductive dielectric screen 14 surrounding the dielectric wall, a moisture barrier 15 surrounding the dielectric screen, a bedding layer 16 of helically applied semi-conductive fibrous tape surrounding the moisture barrier and, surrounding the layer of semi-conductive fibrous tape, a layer 17 of helically wound wires suitable for use as a neutral, earth or ground conductor.

The moisture barrier 15 of the cable core consists of the composite tape 1 which was initially folded as illustrated in FIG. 2 and which has been longitudinally applied to and transversely folded around the dielectric screen 14 in such a way that longitudinally extending edges of the composite tape overlap and are secured to one another throughout their lengths to form a moisture-tight seal by a double-sided adhesive tape 18.

By virtue of the fact that the aluminium foils 3 of the composite tape 1 are in direct electrical contact along the double-folded portion of the composite tape, the moisture barrier 15 formed therefrom effects electrical interconnection between the underlying dielectric screen 14 and, via the bedding layer 16 of semi-conductive fibrous tape, the surrounding layer 17 of helically wound wires constituting the neutral, earth or ground conductor of the core.

What I claim as my invention is:

1. An electric power cable comprising at least one cable core consisting of an electric conductor, a conductor screen surrounding the conductor, a dielectric wall of electrically insulating material surrounding the conductor screen, a dielectric screen surrounding the dielectric wall, a moisture-barrier surrounding the dielectric screen and, surrounding the moisture-barrier, a layer of metal or metal alloy, wherein the moisture-barrier of said at least one cable core consists of a composite tape comprising a carrier layer of plastics material which is sandwiched between radially inner and outer substantially fluid-impermeable foils of metal or metal alloy mechanically bonded to major surfaces of the carrier layer and electrically connected together, which composite tape surrounds the dielectric screen of the core with its longitudinally extending edges overlapping and secured to one another throughout their lengths to form a substantially moisture-tight seal between said overlapping edges, the moisture-barrier thereby effecting electrical interconnection between the underlying dielectric screen and the surrounding layer of metal or metal alloy.

2. An electric power cable as claimed in claim 1, wherein a longitudinally extending marginal portion of the composite tape of the moisture barrier is folded along two longitudinally extending, transversely spaced lines which define first and second portions of said marginal portion so that said first portion of said marginal portion of the composite tape including one of said longitudinally extending edges of said composite tape is sandwiched between said second portion of the marginal portion and a main portion of the composite tape, the two metal foils of the composite tape thereby being directly electrically connected.

3. An electric power cable as claimed in claim 1, wherein the overlapping edges of the composite tape are sealed together throughout their lengths by a hot melt adhesive.

4. An electric power cable as claimed in claim 1, wherein said longitudinally extending edges of said composite tape are secured to one another by adhesive tape.

5. An electric power cable as claimed in claim 1, wherein electrical connection between the metal foils of the composite tape of the moisture barrier is effected by using for the carrier layer a plastics material which is sufficiently semi-conductive to electrically interconnect the metal foils.

6. An electric power cable as claimed in claim 1, wherein the composite tape extends lengthwise along and is transversely folded around the dielectric screen.

7. An electric power cable is claimed in claim 1, wherein each metal foil of the composite tape is mechanically bonded to a major surface of the carrier layer by a substantially continuous layer of hot-melt adhesive.

8. An electric power cable as claimed in claim 1, wherein the plastics material of the carrier layer of the composite tape comprises polyethylene.

9. An electric power cable as claimed in claim 1, wherein each metal foil of the composite tape of the moisture barrier comprises aluminium.

10. An electric power cable as claimed in claim 1, wherein the composite tape has an overall thickness lying in the range of 1.5 to 5 mils (0.038 to 0.127 mm).

11. An electric power cable as claimed in claim 10, wherein each foil of the composite tape comprises aluminium and has a thickness of approximately 0.35 mils (0.009 mm) and the carrier layer of the composite tape has a thickness of approximately 2 mils (0.051 mm).

12. An electric power cable as claimed in claim 1 which has a single core, wherein an electrically conductive bedding layer is sandwiched between the moisture barrier and the surrounding layer of metal or metal alloy and wherein the layer of metal or metal alloy is a layer of helically wound wires.

13. An electric power cable as claimed in claim 1 which has at least two cable cores, wherein the layer of metal or metal alloy of each cable core comprises a layer of helically applied tape of metal or metal alloy.

* * * * *